(12) United States Patent
Garrett

(10) Patent No.: US 10,689,080 B2
(45) Date of Patent: Jun. 23, 2020

(54) OSCILLATING LEVER DRIVEN REVERSIBLE MOTOR

(71) Applicant: Spencer Paul Garrett, Portland, ME (US)

(72) Inventor: Spencer Paul Garrett, Portland, ME (US)

( * ) Notice: Subject to any disclaimer, the term of this patent is extended or adjusted under 35 U.S.C. 154(b) by 41 days.

(21) Appl. No.: 16/167,444

(22) Filed: Oct. 22, 2018

(65) Prior Publication Data

US 2019/0118919 A1 Apr. 25, 2019

Related U.S. Application Data

(60) Provisional application No. 62/574,778, filed on Oct. 20, 2017.

(51) Int. Cl.
| | |
|---|---|
| *B63H 16/18* | (2006.01) |
| *B63H 16/00* | (2006.01) |
| *G05G 1/04* | (2006.01) |
| *F16H 37/12* | (2006.01) |
| *F16H 31/00* | (2006.01) |
| *G05G 1/44* | (2008.04) |
| *B63H 16/08* | (2006.01) |

(52) U.S. Cl.
CPC .............. *B63H 16/18* (2013.01); *B63H 16/00* (2013.01); *B63H 16/14* (2013.01); *F16H 31/001* (2013.01); *F16H 37/122* (2013.01); *G05G 1/04* (2013.01); *G05G 1/44* (2013.01); *B63H 2016/185* (2013.01)

(58) Field of Classification Search
CPC ........ B63H 16/00; B63H 16/14; B63H 16/18; B63H 16/20; B63H 21/00; B63H 21/17; B63H 21/20
USPC ............................ 440/21, 25, 26, 27, 30, 31
See application file for complete search history.

(56) References Cited

U.S. PATENT DOCUMENTS

| | | | | |
|---|---|---|---|---|
| 4,795,381 A * | 1/1989 | Willems | ................. | B63H 16/14 440/26 |
| 5,362,264 A * | 11/1994 | Parant | .................... | B63H 16/14 440/30 |
| 5,374,206 A * | 12/1994 | Gregory | ................. | B63H 16/14 440/27 |
| 6,309,263 B1 * | 10/2001 | Mier-Maza | ............ | B63H 16/14 440/21 |
| 6,712,653 B2 * | 3/2004 | Free | ....................... | B63H 16/14 440/27 |
| 7,371,138 B2 * | 5/2008 | Spass | ..................... | B63H 16/14 440/21 |
| 7,549,902 B2 * | 6/2009 | Jansen | ................... | B63H 16/14 440/27 |
| 2008/0188146 A1 * | 8/2008 | Howard | ................. | B63H 16/20 440/30 |
| 2009/0061703 A1 * | 3/2009 | Song | ...................... | B63H 16/14 440/27 |

* cited by examiner

*Primary Examiner* — Lars A Olson
(74) *Attorney, Agent, or Firm* — Z IP Law PLLC

(57) ABSTRACT

An oscillating reversible motor providing a novel means of converting oscillating motion into selectable clockwise or counterclockwise rotary motion. More particularly, the invention presents a novel approach to a foot or hand pedal driven apparatus with which a traditional rotary water propeller or other output device may be employed in both forward and reverse directions of relative motion.

16 Claims, 15 Drawing Sheets

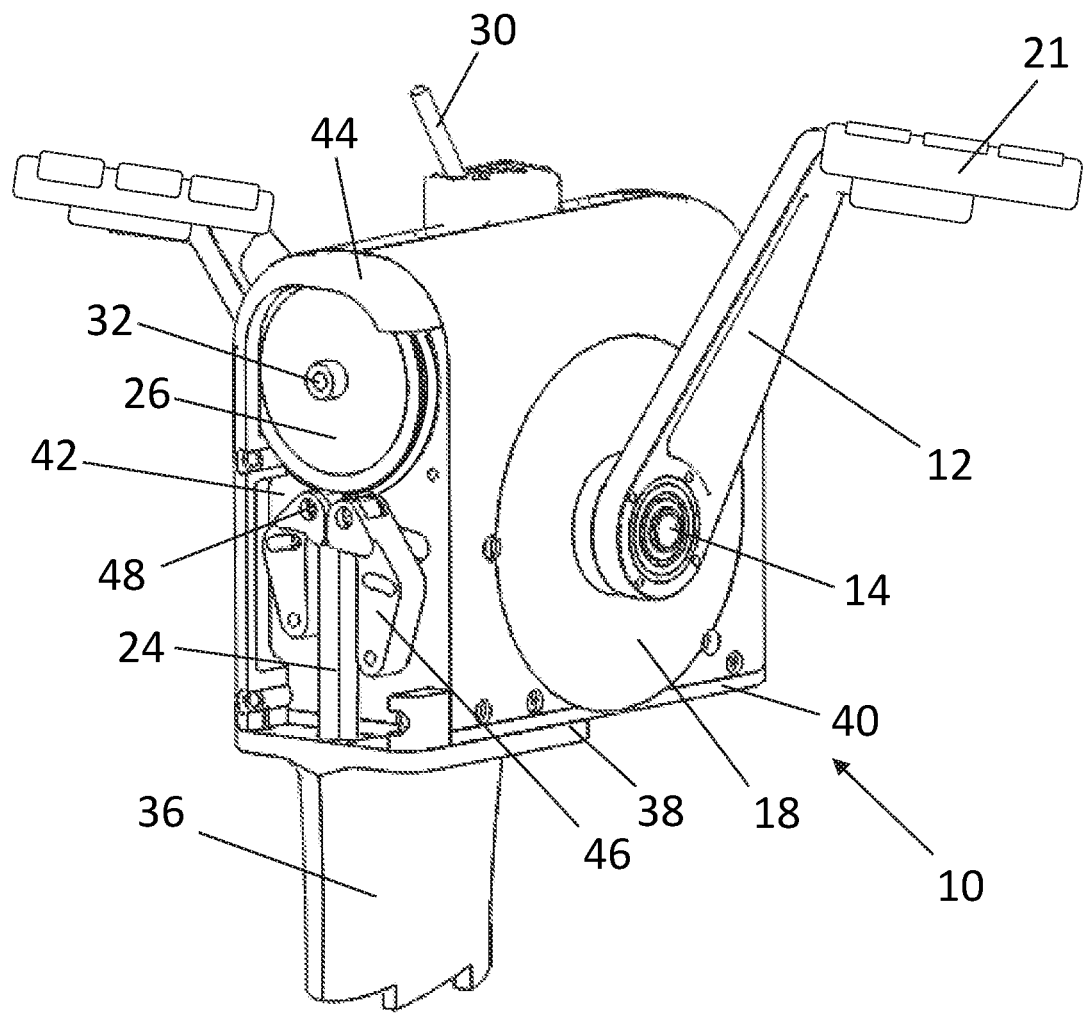
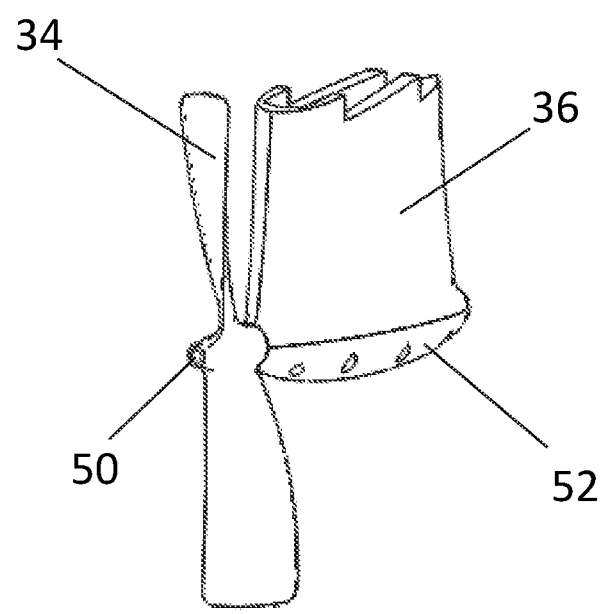
FIG. 2

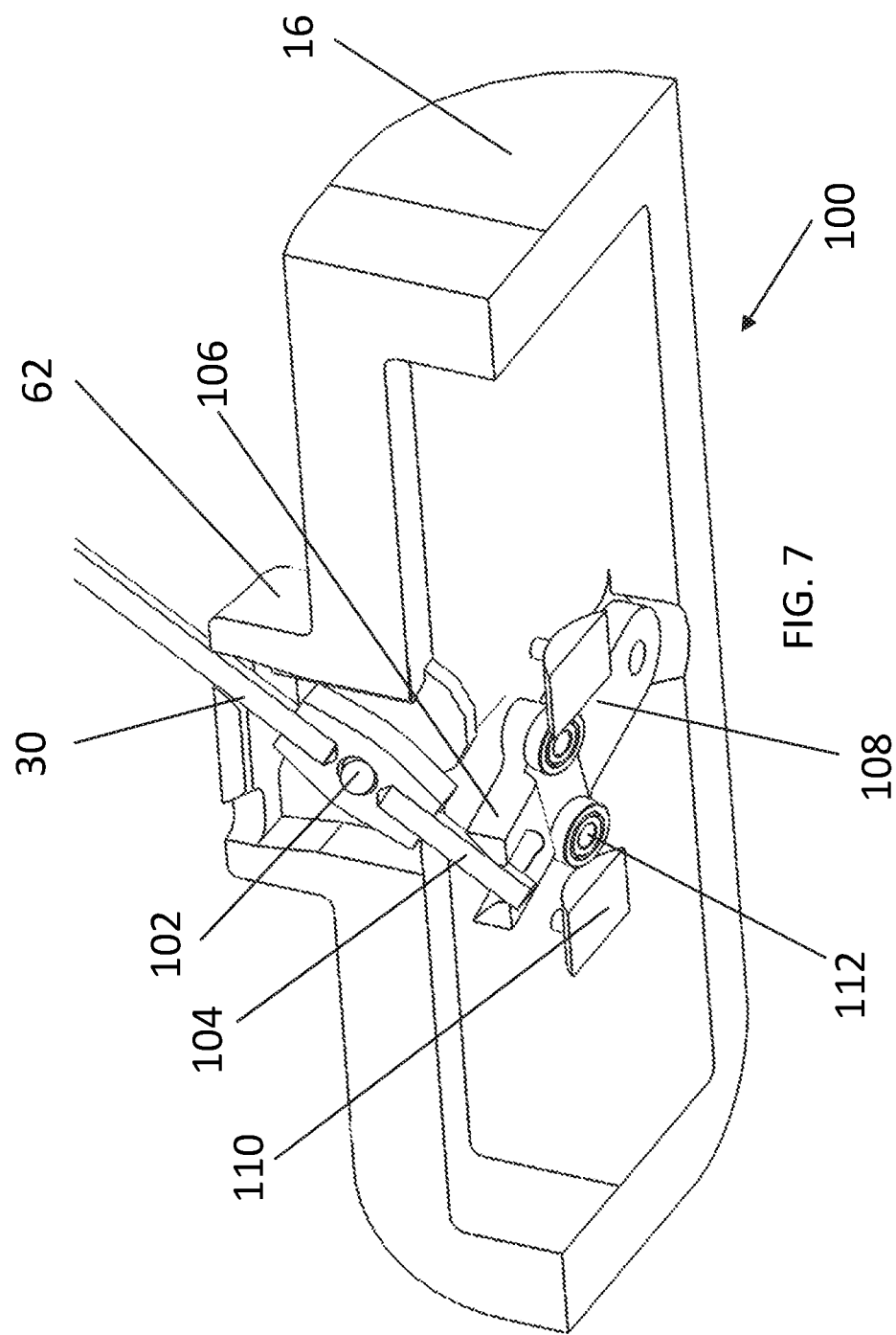

OSCILLATING LEVER DRIVEN REVERSIBLE MOTOR

RELATED APPLICATION

This application claims the benefit of U.S. Provisional Patent Application No. 62/574,778 filed Oct. 20, 2018 entitled OSCILLATING LEVER DRIVEN REVERSIBLE WATER THRUSTER which is hereby incorporated herein by reference in its entirety.

FIELD OF THE INVENTION

The present invention relates to a novel means of converting oscillating motion into selectable clockwise or counterclockwise rotary motion. More particularly, the invention presents a novel approach to a foot or hand pedal driven apparatus with which a traditional rotary water propeller or other output device may be employed in both forward and reverse directions of relative motion.

BACKGROUND

The recreational water sports industry has recently adopted alternate means of propelling human powered craft through the application of various foot pedal driven devices instead of traditional paddles and oars. The devices currently employed throughout the industry fall into two general technical classifications.

The first classification adopts a rotary drive mechanism very similar to a bicycle pedal assembly. This pedal assembly is configured to rotate a traditional rotary water propeller through various mechanical transmission configurations. This type of device permits forward and reverse thrust depending on which direction the user is moving the rotary pedal assembly, specifically clockwise or counterclockwise.

The second classification utilizes an oscillating pedal drive input which transmits torque through mechanical linkages to submerged fins which swing through semi-circle arcs beneath the pedal assembly. Due to the nature of this type of device, only a single direction of motion is available and cannot be altered without physically reorienting the device relative to the watercraft.

The recreational water sports industry has identified the benefit of oscillating pedal motion due to its mechanical efficiency and reduced fatigue on the user. Rotating water propellers are preferred within the industry due to their simplicity in design and manufacturing which leads to reduced part and assembly costs. Mating the oscillating input with a rotary propeller output may appear to be a natural progression of prior art, however in prototype devices that convert oscillating input motion into rotary output motion, all attempts have utilized gear trains and clutches which are heavy, noisy, and complicated. The cost of manufacturing a hybrid water thruster utilizing oscillating input and rotary output must correspond to what the recreational water sport market can support, thus a device which can be successfully manufactured and sold must be lightweight and simple in design and execution.

BRIEF SUMMARY OF THE INVENTION

The present invention comprises a novel oscillating reversible motor which generally utilizes levers for the input of hand or foot originated force. If two levers are employed, the levers swing thru counter rotating arcs to transmit torque to the rotary output device. If more or less than two levers are utilized, the configuration of the invention would remain similar, accounting for the necessary revisions to accommodate the input configuration and therefore be within the scope of the present invention. In this present iteration of the invention, two levers are employed which are configured to be cycled with the user's hands or feet. The output device could be any means of transferring rotary motion to linear motion thru the use of a water rotary propeller or a wheel. In this present iteration of the invention a rotary water propeller is depicted as the means for generating thrust for water craft propulsion. The torque generated by the lever input device is transferred to a rotary shaft on which torque conversion units are mounted. The torque conversion unit provides the means for directing the output rotation direction and torque to the output device. A shift sleeve or collar is applied thru a user actuated selection switch to bias the torque conversion units for clockwise or counterclockwise output rotation. Torque transfer from the torque conversion unit shaft to the output device can occur thru traditional mechanical means which may include shaft and gear assemblies, belts, or other mechanisms.

It is an object and advantage that the oscillating reversible motor of the present invention converts oscillating motion into a rotary output.

It is an object and advantage that the oscillating reversible motor of the present invention rotation of rotary output is reversible.

It is an object and advantage that the oscillating reversible motor of the present invention provide for selecting the direction of rotation and propulsion.

It is an object and advantage that the oscillating reversible motor of the present invention provide input levers that swing thru counter rotating arcs to transmit torque to a rotary output device.

It is an object and advantage that the oscillating reversible motor of the present invention provide input levers that provide for operation of the motor using a hand stroke or foot stride.

It is an object and advantage that the oscillating reversible motor of the present invention provide torque conversion units that apply torque in the selected direction of rotation during the stroke of the input lever and freewheel during the backstroke of the input lever.

It is an object and advantage that the oscillating reversible motor of the present invention provide a directional switch for the selection of rotation and propulsion.

It is an object and advantage that the oscillating reversible motor of the present invention provide pins and cam rollers that are biased to a rotational direction based on the selected direction of rotation.

It is an object and advantage that the oscillating reversible motor of the present invention provide an inner cam lobe which transfers torque to a rotary output device.

It is an object and advantage that the oscillating reversible motor of the present invention provide torque to a torque conversion unit using a drive strap connected to first and second input levers.

The present invention is related to a motor for the conversion of an oscillating input to a rotary output which is reversible by user selection, comprising one or more oscillating torque inputs; one or more torque conversion units, the torque conversion units comprising an inner cam lobe configured to transfer torque to a rotary shaft; a bell housing configured to apply torque and freewheel on alternating phases of the oscillating torque inputs; a directional selection switch configured to select the rotational direction of torque output; and a drive shaft configured to transfer the selected unidirectional rotational torque to an output device. The oscillating torque inputs of the motor may comprise levers operable by a foot or hand. The output device of the motor may be a propeller to perform propulsion through fluidic mediums. The torque conversion units of the motor may in some embodiments comprise a bias pin plate having a plurality of pins; a plurality of cam rollers movable within a void formed between the inner cam lobe and the bell housing; and wherein the plurality of pins of the bias pin plate bias the cam rollers in the selected rotational direction. In some embodiments, the torque conversion units may comprise a bias pin plate; a plurality of linkage connectors; and wherein the linkage connectors bias the bias pin plate in the selected rotational direction. The drive shaft of the motor may be in parallel with the output shaft or be perpendicular to the output shaft.

The present invention is further related to an oscillating reversible motor comprising a first input lever connected to a second input lever and operable to apply torque to a first torque conversion unit on a forward stroke and return on a backstroke; the first torque conversion unit configured to apply torque to a rotatable shaft on the forward stroke of the first input lever and disengage from the rotatable shaft and freewheel during the backstroke of the first input lever; the second input lever operable to apply torque to a second torque conversion unit on a forward stroke of the second input lever and return on a backstroke; the second torque conversion unit configured to apply torque to a rotatable shaft on the forward stroke of the second input lever and disengage from the rotatable shaft and freewheel during the backstroke of the second input lever; and wherein the first and second input levers oscillate to rotate the rotatable shaft in a single direction. The oscillating reversible motor may comprise a direction selection switch configured to set the direction of rotation of the rotatable shaft as a clockwise or counterclockwise rotation. The direction selection switch may comprise a shift sleeve movable along the rotatable shaft and a plurality of linkage connectors configured to bias the first and second torque conversion units in the direction of rotation selected using the direction selection switch. The first and second torque conversion units of the oscillating reversible motor may in some embodiments comprise a plurality of cam rollers; an inner cam lobe; a bell housing and bias pin plate encasing the inner cam lobe along the rotatable shaft and providing a void for the cam rollers to freely move within interference zones formed between the inner cam lobe and bell housing; and wherein the bias pin plate having pins for biasing the cam rollers to apply torque to the rotatable shaft in the selected rotational direction.

The present invention is further related to a method of converting oscillating motion into rotary motion comprising connecting a first input device to a second input device with each of the first and second input devices oscillating from a forward stroke to a backstroke; applying torque to a first torque conversion unit from the forward stroke of the first input device; freewheeling the first torque conversion unit on the backstroke of the first input device; applying torque to a second torque conversion unit from the forward stroke of the second input device; freewheeling the second torque conversion unit on the backstroke of the second input device; biasing the rotational direction of the applied torque from the first and second torque conversion units to a single rotational direction; and rotating a drive shaft in the single rotational direction from the applied torque of the first and second torque conversion units. Embodiments of the method of converting oscillating motion into rotary motion may comprise biasing a plurality of cam rollers in the single rotational direction. In some embodiments, the method may comprise forming a plurality of interference zones between a bell housing and the inner cam lobe for the plurality of cam rollers. The method may also comprise linking a bias pin plate to a shaft sleeve; biasing a plurality of pins in the selected direction of rotation from the linking of the bias pin plate to the shaft sleeve; and biasing a plurality of cam rollers in the single rotational direction using the plurality of pins. The method of converting oscillating motion into rotary motion in some embodiments comprises selecting the single rotational direction as clockwise by linking a shaft sleeve to a bias pin plate of the first torque conversion unit; selecting the single rotational direction as counterclockwise by linking a shaft sleeve to a bias pin plate of the second torque conversion unit.

These and other features, advantages and improvements according to this invention will be better understood by reference to the following detailed description and accompanying drawings. While references may be made to upper, lower, vertical and horizontal, these terms are used merely to describe the relationship of components and not to limit the operation of the present invention to any one orientation.

BRIEF DESCRIPTION OF THE DRAWINGS

Some embodiments of the present invention are illustrated as an example and are not limited by the figures of the accompanying drawings, in which like references may indicate similar elements and in which:

FIG. 2 is a perspective view of an embodiment of the oscillating reversible motor of the present invention showing the drive shaft assembly for transferring rotational torque from the oscillating reversible motor to an output device illustrated in this embodiment as a rotary water propeller;

FIG. 7 is a perspective view of an embodiment of a directional switch assembly in an embodiment of the oscillating reversible motor of the present invention;

DETAILED DESCRIPTION OF THE INVENTION

The terminology used herein is for the purpose of describing particular embodiments only and is not intended to be limiting of the invention. As used herein, the singular forms "a," "an," and "the" are intended to include the plural forms as well as the singular forms, unless the context clearly indicates otherwise. It will be further understood that the terms "comprises" and/or "comprising" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skills in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has an individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention.

A new device for transferring oscillating input motion into rotary output motion for the purposes of driving a rotary load are described herein. In the following description, for the purposes of explanation, numerous specific details are set forth in order to provide a thorough understanding of the present invention. It will be evident to one skilled in the art that the present invention may be practiced without these specific details.

Figure 1:
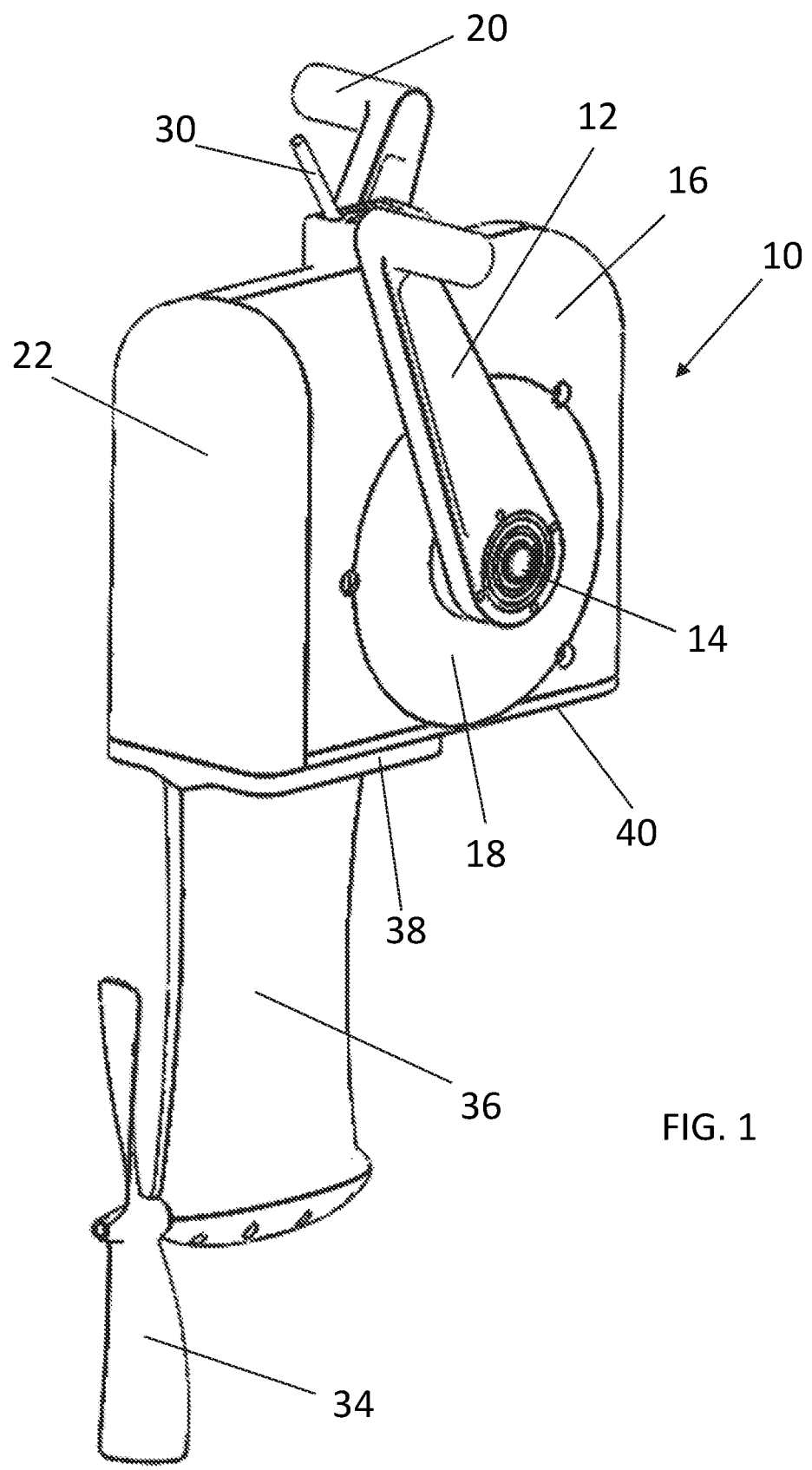
FIG. 1 is a perspective view of an embodiment of the oscillating reversible motor of the present invention in a two lever rotary water propeller configuration.
Figure 3A:
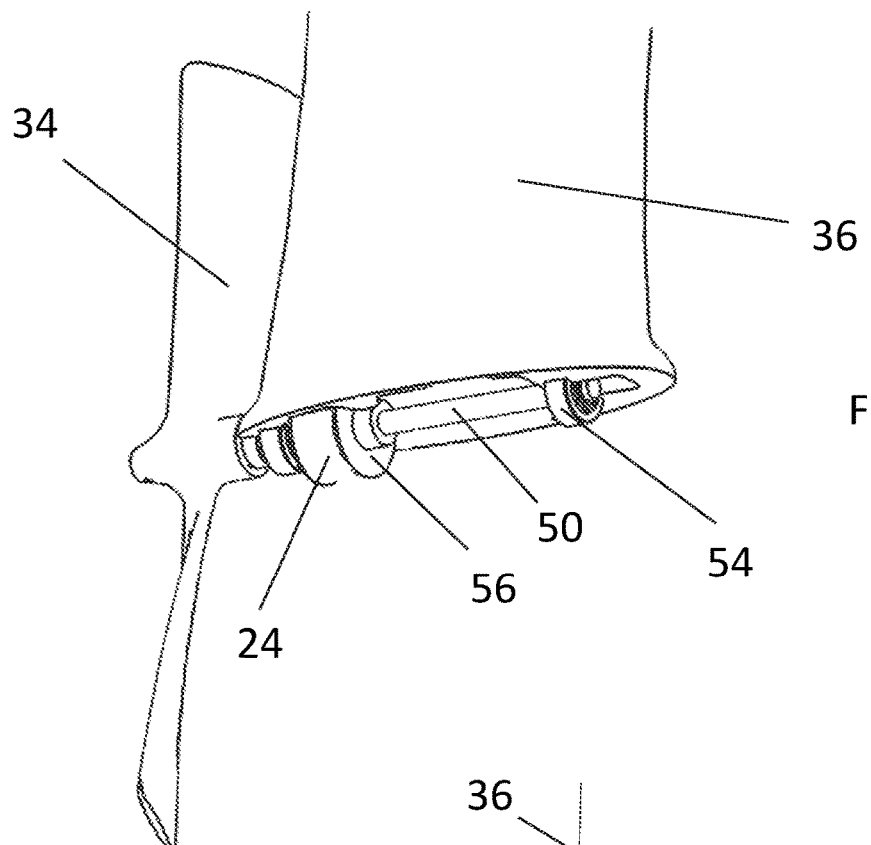
FIGS. 3A and 3B are perspective views of the output device of the oscillating reversible motor with an embodiment of an output shaft assembly.
Figure 3B:
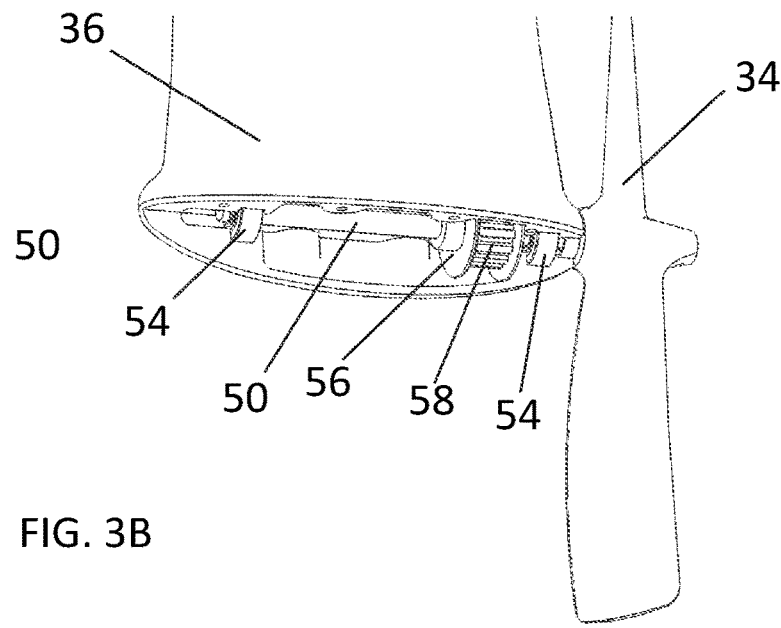

The present invention will now be described by referencing the appended figures representing preferred embodiments. FIG. 1 depicts the assembled oscillating reversible lever driven motor 10 which may be referred to as a water thruster in one of many various potential embodiments. In preferred embodiments, there is an input section utilizing one or more oscillating movements through rotating levers 12 or other means. The input levers 12 are connected to an input shaft 14 which extends into the motor housing 16. A wheel cover 18 affixed to the motor housing 16 may be provided. The levers 12 may in some embodiments have handles 20 for hand operation of the motor 10 or pedals 21 for foot operation. An upper drive shaft assembly cover 22 is affixed to the motor housing 16 to enclose the drive belt 24 and drive shaft pulley 26 separately from the motor housing 16 as shown in FIG. 2. A direction selection switch 30 sets the drive shaft 32 and torque output device which in this embodiment is a water propeller 34 to rotate in either a clockwise or counterclockwise direction. The water propeller 34 is mounted on an offset strut 36 extending from a platform 38 affixed to the base 40 of the motor housing 16. The drive shaft pulley 26 is mounted on the drive shaft 32 and positioned on the internal side 42 of the motor housing 16. A pulley guard 44 may be provided to partially cover the drive shaft pulley 26. Belt tensioning arms 46 are mounted on an adjustable pivot pin 48 to properly tension the drive belt 24. The water propeller 34 is affixed to an output shaft 50 that is rotatably connected to the drive belt 24 using an output pulley 56 as shown in FIG. 3A. The drive shaft pulley 26 and output pulley 56 may each have a toothed gear 58 to turn the drive belt 24, and bearings 54 may be provided to have the output shaft 50 turn freely, as shown in FIG. 3B.

In the current embodiment, a dual pulley drive assembly system with a drive belt provides the torque output for the invention as depicted herein through the rotary water propeller 34. The flexible drive belt 24 transfers torque between the drive shaft pulley 26 and output pulley 56, with belt tension being controlled by tensioning arms 46. Other torque output systems utilizing rotary motion can be fitted to adapt the oscillating reversible motor 10 to other applications both fluidic and terrestrial in nature. In this depiction, the rotary water propeller 34 is affixed to the motor housing 16 using the offset strut 36 for the purpose of locating the torque output device within proper orientation relative to the user and the fluidic medium. Those familiar with the art will recognize that there are many mechanisms for the transfer of torque between shafts in various orientations to one another, all of which may be employed thru various modifications to the oscillating reversible motor 10. The mechanisms with which torque is transferred between the oscillating reversible motor 10 and output device can be embodied in many ways which are not specifically addressed within the body of this description but are intended to be encompassed within the scope of the present invention.

Figure 4A:
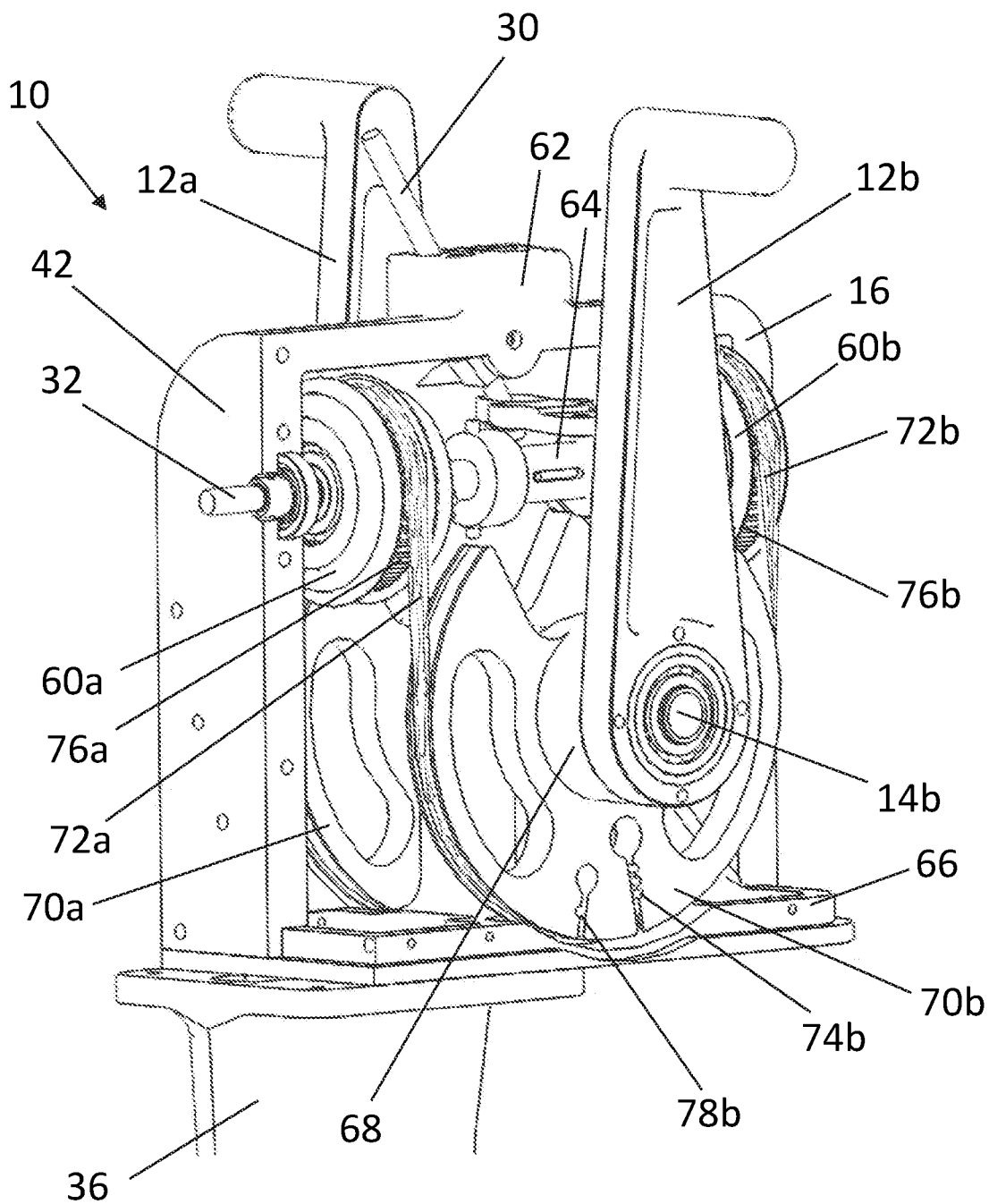
FIG. 4A is a perspective view of an embodiment of the oscillating reversible motor of the present invention showing an embodiment of the torque conversion assembly within the motor housing with a two lever arrangement in an upright orientation.

As shown in FIG. 4A, the drive pulley 26, belt 24, and belt tensioning arms 46 have been removed for illustration to show the drive shaft 32 extending through the internal side 42 of the motor housing 16. Two torque conversion units 60a and 60b are attached on each end of the drive shaft 32 and the opposing end (not shown) of the drive shaft 32 is rotatably affixed to the motor housing 16. The direction selection switch 30 extends through a switch block 62 positioned at the top of the motor housing 16 between the levers 12a and 12b with the direction selection switch 30 being connected to a shift sleeve 64 that is movable along the drive shaft 32. When the direction selection switch 30 is adjusted the shift sleeve 64 moves along the drive shaft 32 to engage with either a first torque conversion unit 60a to turn the drive shaft 32 in a counter clockwise direction or to engage with a second torque conversion unit 60*b* to turn the drive shaft 32 in a clockwise direction. The ability to manually select the direction of output torque rotation is not mandatory for the oscillating reversible motor 10 to properly function in one direction or another, and the means to shift output torque rotation can be eliminated without compromising the intent of the device.

Figure 4B:
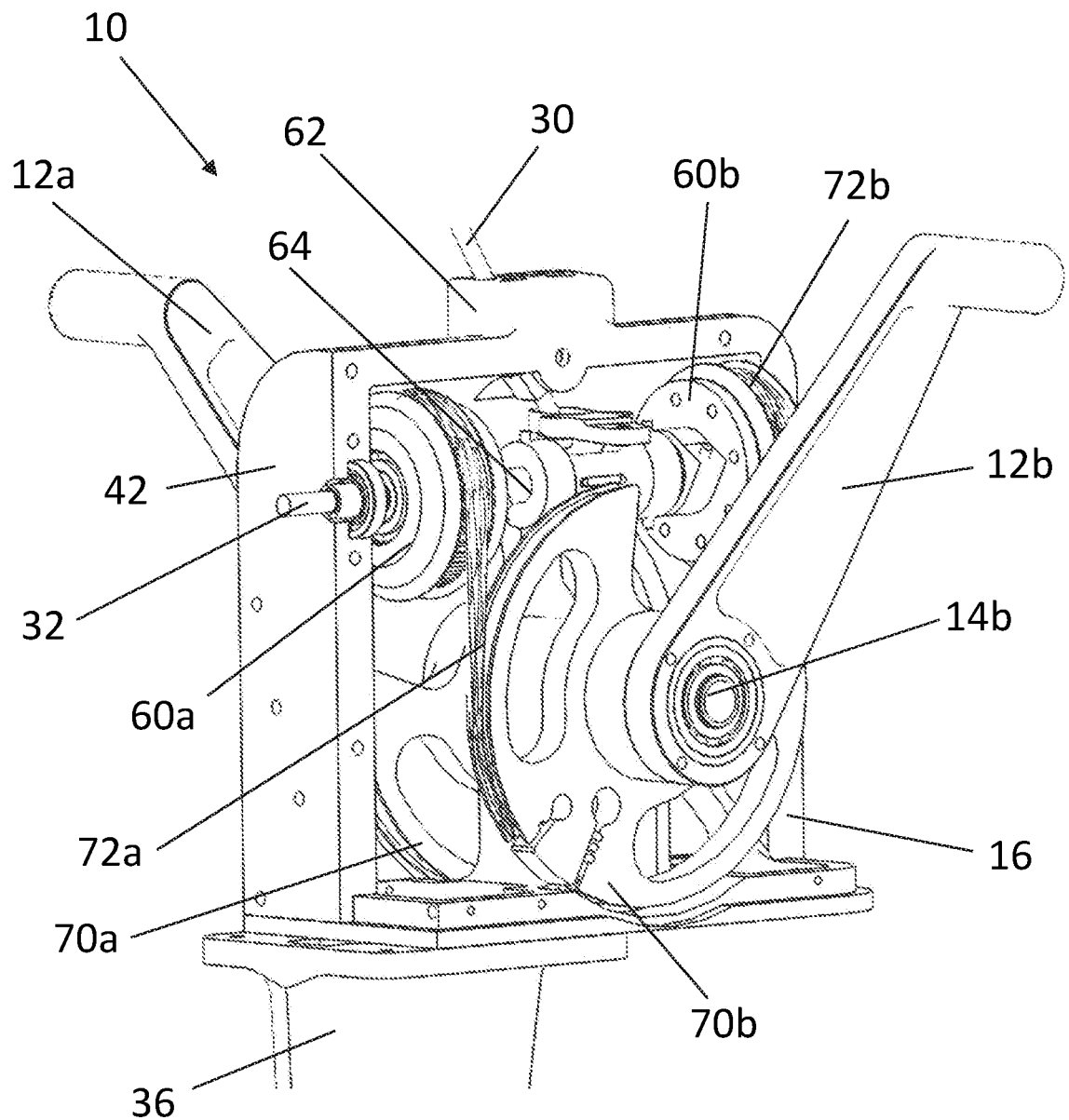
FIG. 4B is a perspective view of an embodiment of the oscillating reversible motor of the present invention showing an embodiment of the torque conversion assembly within the motor housing with the two lever arrangement in a clockwise orientation.
Figure 4C:
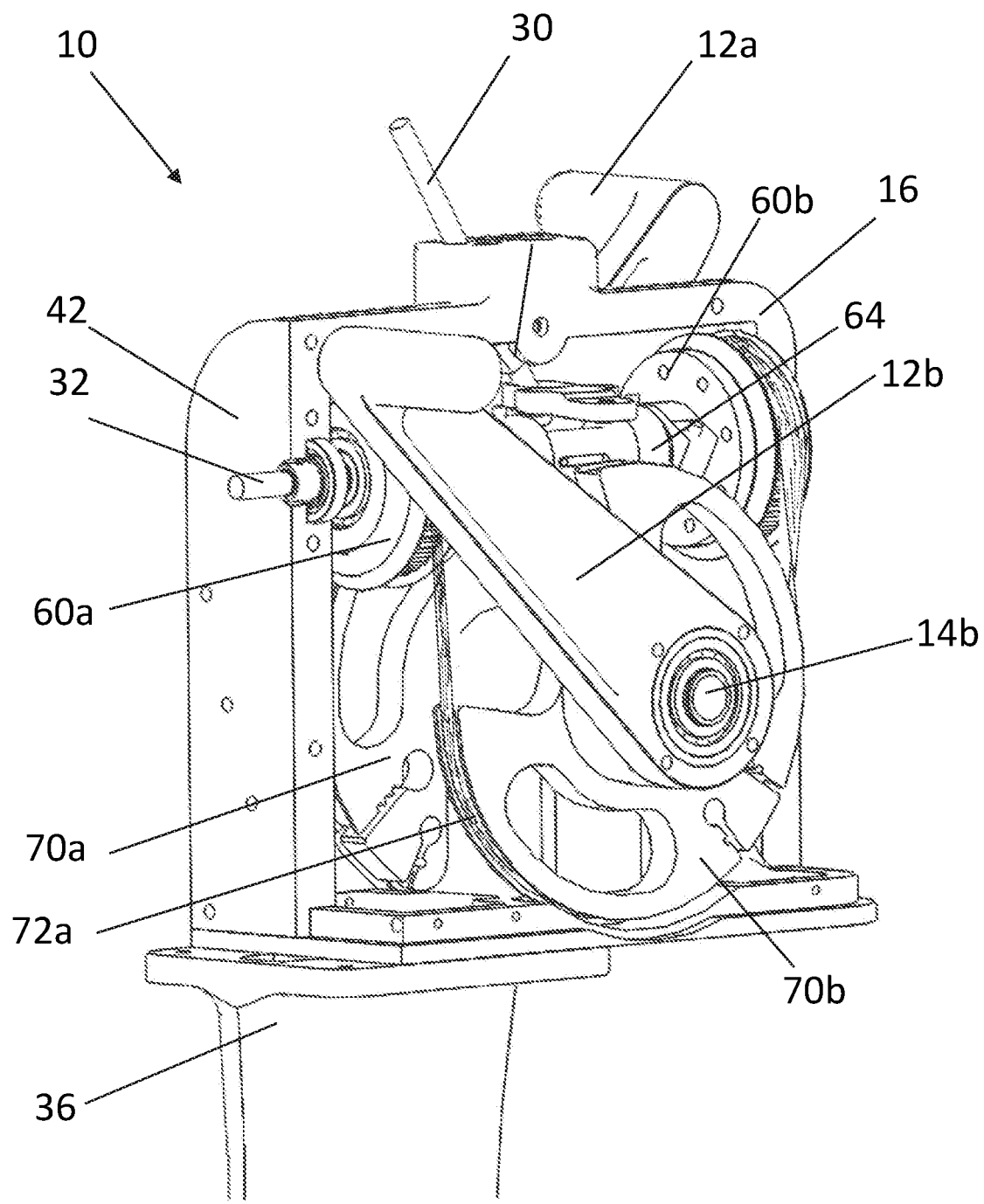
FIG. 4C is a perspective view of an embodiment of the oscillating reversible motor of the present invention showing an embodiment of the torque conversion assembly within the motor housing with the two lever arrangement in a counterclockwise orientation.

In this embodiment, the input levers 12*a* and 12*b* are each attached to a separate input shaft 14, input shaft 14*a* (not shown) for input lever 12*a* and input shaft 14*b* for input lever 12*b*. The input shaft 14 extends into the motor housing 16 in a direction perpendicular to the drive shaft 32 and each input shaft 14*a* or 14*b* is rotatably mounted on a frame support 66. A spacer 68 that may have bearings is positioned behind the lever 12 and an input wheel 70 is affixed to the input shaft 14. The wheel cover 18 surrounds the input shaft 14 between spacer 68 and the input wheel 70 and is secured to the motor housing 16 to cover and protect the user from rotation of the input wheel 70. A drive strap 72 is attached to a pinch clamp 74 within the input wheel 70. The strap 72 is threaded along the input wheel 70 and around the drive gear 76 of the torque conversion unit 60 to be attached to the other input wheel 70 at a pin clip 78. As shown in FIG. 4A, the drive strap 72*a* is attached to the pinch clamp 74*a* (not shown) on input wheel 70*a* for lever 12*a*. The first drive strap 72*a* extends along the input wheel 70*a* and over the torque conversion unit 60*a* with the teeth of the strap 72*a* engaging in the drive gear 76*a* of the torque conversion unit 60*a*. The drive strap 72*a* then extends along the input wheel 70*b* and attaches to the pin clip 78*b* of input wheel 70*b*. Similarly, the second drive strap 72*b* is attached to the pinch clamp 74*b* and extends along the input wheel 70*b* around the drive gear 76*b* of the torque conversion unit 60*b* and is attached to pin clip 78*a* (not shown) of input wheel 70*a*. The attachment of each strap 72 to each of the input wheels 70*a* and 70*b* provides for lever 12*a* to move in the opposite direction to lever 12*b* as shown in FIG. 4B and by oscillating the levers 12*a* and 12*b* torque is applied in a forward stroke of lever 12*a* to the torque conversion unit 60*a* and in a forward stroke of lever 12*b* to the torque conversion unit 60*b*. Therefore, as lever 12*a* is pushed forward, the strap 72*a* is pulled and stretched while strap 72*b* is recoiling around input wheel 70*b* and pulling lever 12*b* on a backstroke to reposition lever 12*b* for a forward stroke, making each arm pull or stride easier on the user where each of the wheels 70*a* and 70*b* make only a partial rotation and return. As shown in FIG. 4C, lever 12*b* is pushed forward forcing the strap 72*b* into tension as strap 72*a* pulls lever 12*a* on a backstroke into position to be pushed or pedaled again. Unlike a bicycle pedal that requires a full rotation to reset and have the pedal in a position for the foot to stride and press on the pedal again, the motor 10 of the present invention provides torque to the output by oscillating back and forth with each movement in tandem of the levers 12*a* and 12*b* and input wheels 70*a* and 70*b* with the torque conversion units 60*a* and 60*b* rotating in the same direction as set by the directional selection switch 30 as described herein. The oscillating reversible motor 10 is therefore easier to operate with less energy and mobility of the user required, which may be very beneficial for a user having limited or partial use of their arms or legs.

Figure 5:
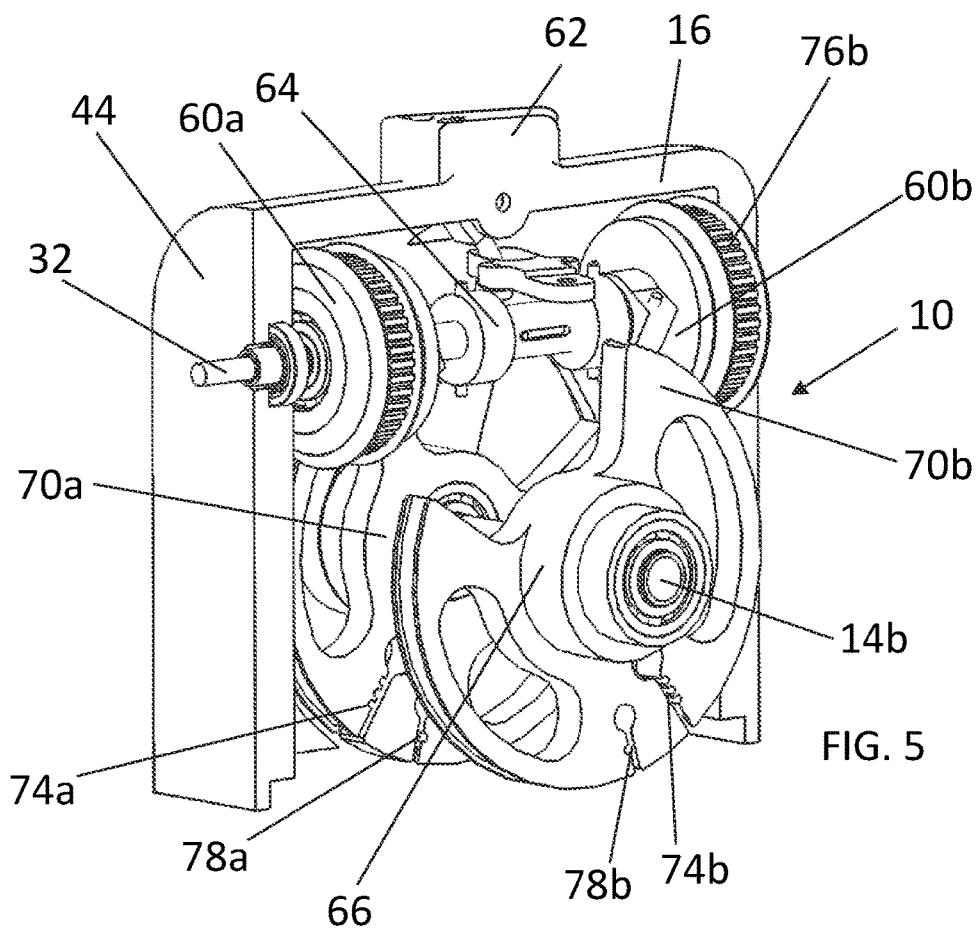
FIG. 5 is a perspective view of an embodiment of the torque conversion assembly and input wheels within the motor housing in an embodiment of the oscillating reversible motor of the present invention.

In FIG. 5, the general configuration of the embodiment of the oscillating reversible motor 10 is shown. Input wheels 70*a* and 70*b* are allowed to rotate around input shafts 14*a* and 14*b* which, in this particular embodiment, are on a common axis but could be configured differently with the input shafts 14*a* and 14*b* being offset from one another as an example within the bounds of the present invention. The input levers 12*a* and 21*b* are affixed to the input wheels 70*a* and 70*b* to transfer torque from the levers 12*a* and 12*b* to the torque conversion units 60*a* and 60*b* using the drive straps 72*a* and 72*b*. The drive straps 72*a* and 72*b* are anchored to the input wheels 70*a* and 70*b*, with one end of each drive strap 72 being affixed to the pinch clamp 74 of one input wheel 70 and the other end being affixed to the pin clip 78 of the other input wheel 70 with the purpose of transferring torque from the input wheels 70 to the drive straps 72. The drive strap 72 engages with the drive gear 76 along the perimeter of the torque conversion unit 60. Those familiar with the art recognize that other devices and mechanical structures may be implemented to transfer torque to the perimeter of the torque conversion unit 60 and those structures can be embodied in methods other than those shown and thus the depiction here is just one mode of accomplishing the linkage.

Figure 6:
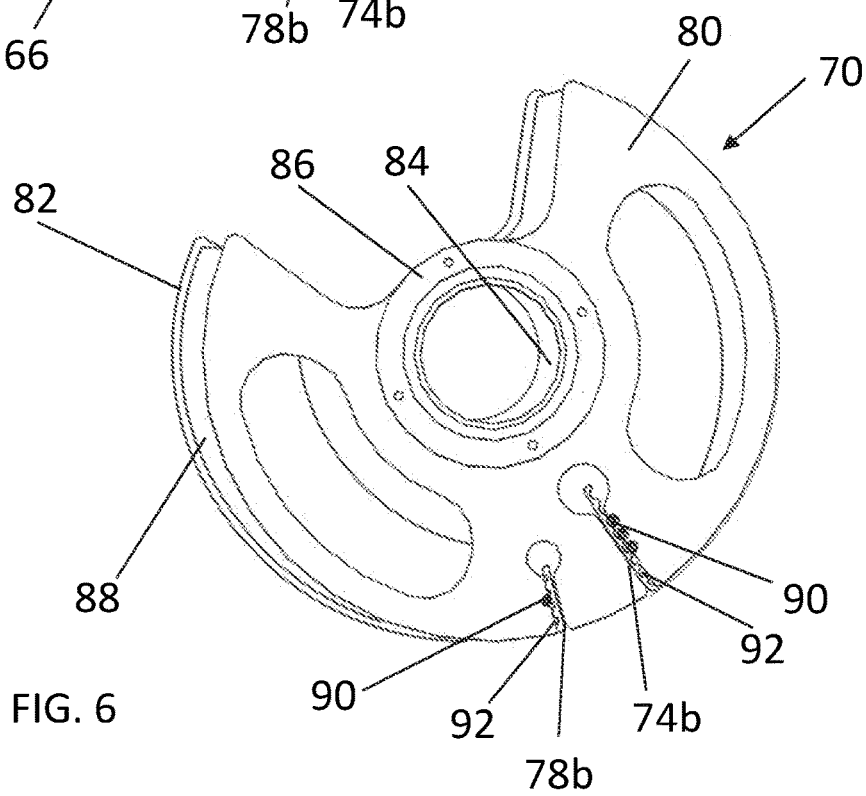
FIG. 6 is a perspective view of an embodiment of an input wheel in an embodiment of the oscillating reversible motor of the present invention.

As shown in FIG. 6, the input wheel 70 preferably is formed with a portion for example a quadrant removed to provide room for other components of the oscillating reversible motor 10 and lighten the weight. The input wheel 70 has a front frame 80 coupled with a rear frame 82 using a shaft cylinder 84. A collar 86 which may have bearings is provided around the shaft cylinder to have the input wheel 70 turn freely on the input shaft 14. A belt track 88 is formed between the front and rear frames 80 and 82 to hold the strap 72 along the perimeter of the input wheel 70 and reduce wear from repeated oscillations of the motor 10. The strap 72 preferably has teeth to have one end of a strap 72 be inserted within a pinch clamp 74 that has a series of pins 90 placed in between ridges 92 that engage with the teeth of the strap 72 and hold and lock the strap 72 to a first input wheel 70*a*. The other end of the strap 72 is inserted in a pin clip 78 of a second input wheel 70. The pin clip 78 has one or more pins 90 placed in between ridges 92 to engage the teeth and lock the other end of the strap 72 around the torque conversion unit 60 to the second input wheel 70*b*.

The locking of each end of the drive strap 72 to each of the input wheels 70*a* and 70*b* provides for oscillation of the levers 12*a* and 12*b* to generate the torque of the motor 10. However, the rotation of the drive shaft 32 does not turn in a clockwise direction and then back in a counterclockwise direction with each oscillation because of a unique directional locking mechanism of the torque conversion units 60*a* and 60*b* that sets the rotation of the drive shaft 32 as described herein. As shown in FIG. 7, the directional switch assembly 100 comprises the direction selection switch 30 that extends into the motor housing 16 through the switch block 62 to a pivot pin 102 rotatably affixed to the motor housing 16. A selection rod 104 extends from the pivot pin 102 to engage a shift fork 106. The shift fork 106 is mounted on a pivot arm 108 that is also affixed to the motor housing 16. Extending from the shift fork 106 are locking tabs 110 that are attached to springs 112 or other shock absorption mechanisms to allow the locking tabs 110 to vibrate with the movement of the drive shaft 32 without inhibiting the rotation. The locking tabs 110 are aligned within disks 114 of the shift sleeve 64 to, when the directional switch 30 is selected, move the shift sleeve 64 to engage one of the torque conversion units 60 to set the direction of rotation of the drive shaft 32.

Figure 8A:
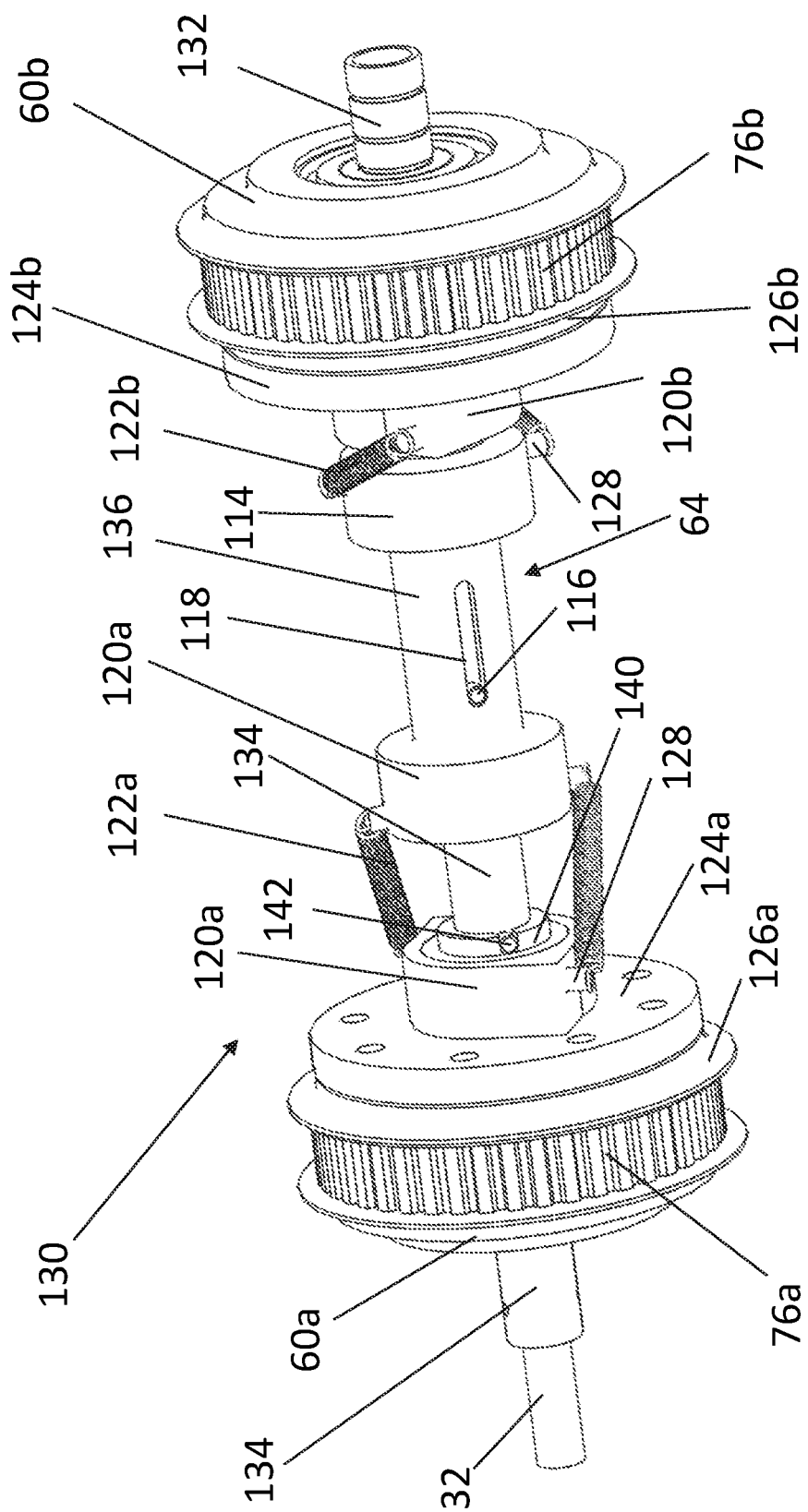
FIGS. 8A and 8B are perspective views of an embodiment of the torque conversion assembly in an embodiment of the oscillating reversible motor of the present invention.

As shown in FIG. 8A, the shift sleeve 64 is held to rotate in synchronicity with the drive shaft 32 using a guide pin 116 that extends from the drive shaft 32 into the slot 118 of the shift sleeve 64. The guide pin 116 and slot 118 configuration permits the shift sleeve 64 to slide axially along the drive shaft 32 within a constrained path. The locking tabs 110 of the directional switch assembly 100 with their shock absorption interact with the shift sleeve 64 to hold the shift sleeve's axial position along the drive shaft 32 relative to the axially static elements of the oscillating reversible motor 10. As the locking tabs 110 engage the shift sleeve disks 114 and slide the shift sleeve 64 along the drive shaft 32, the shift sleeve 64 engages a linkage assembly of each of the torque conversion units 60a and 60b to impart a consistent torque bias on each torque conversion unit 60a and 60b simultaneously to maintain the rotation of the drive shaft 32 in a single direction. In other embodiments, this consistent bias torque is transferred to the torque conversion units 60a and 60b using various linkage assembly configurations, each of which are within the scope of the present invention with only one being depicted herein.

The torque conversion assembly 130, as shown in FIG. 8A, rotates within the motor housing 16 via a shaft support 132 on the opposing end of the drive shaft 32 from the drive pulley 26 or using other suitable mechanisms to have the drive shaft 32 rotate freely within the motor housing 16. A sleeve 134 may be formed around and be rotatable with the drive shaft 32 to have the drive shaft 32 rotate freely when inserted through the internal side 44 of the motor housing 16. The torque conversion units 60a and 60b are radially aligned and affixed to each end of the drive shaft 32. The body 136 of the shift sleeve 64 provides structural support for the shift sleeve disks 114 and provides the slot 118 for the guide pin 116 of the drive shaft 32 to have the shift sleeve 64 rotate with the drive shaft 32. The slot 118 also provides for the shift sleeve 64 to slide along the drive shaft 32 when the directional switch 30 is selected shifting the locking tabs 110 and thereby forcing the shift sleeve disks 114 to move in one direction along the drive shaft 32 or in the other direction. Other embodiments with various orientations of the drive shaft and positioning of the drive assembly system and torque conversion units including the number of torque conversion units are within the scope of the present invention.

Figure 8B:
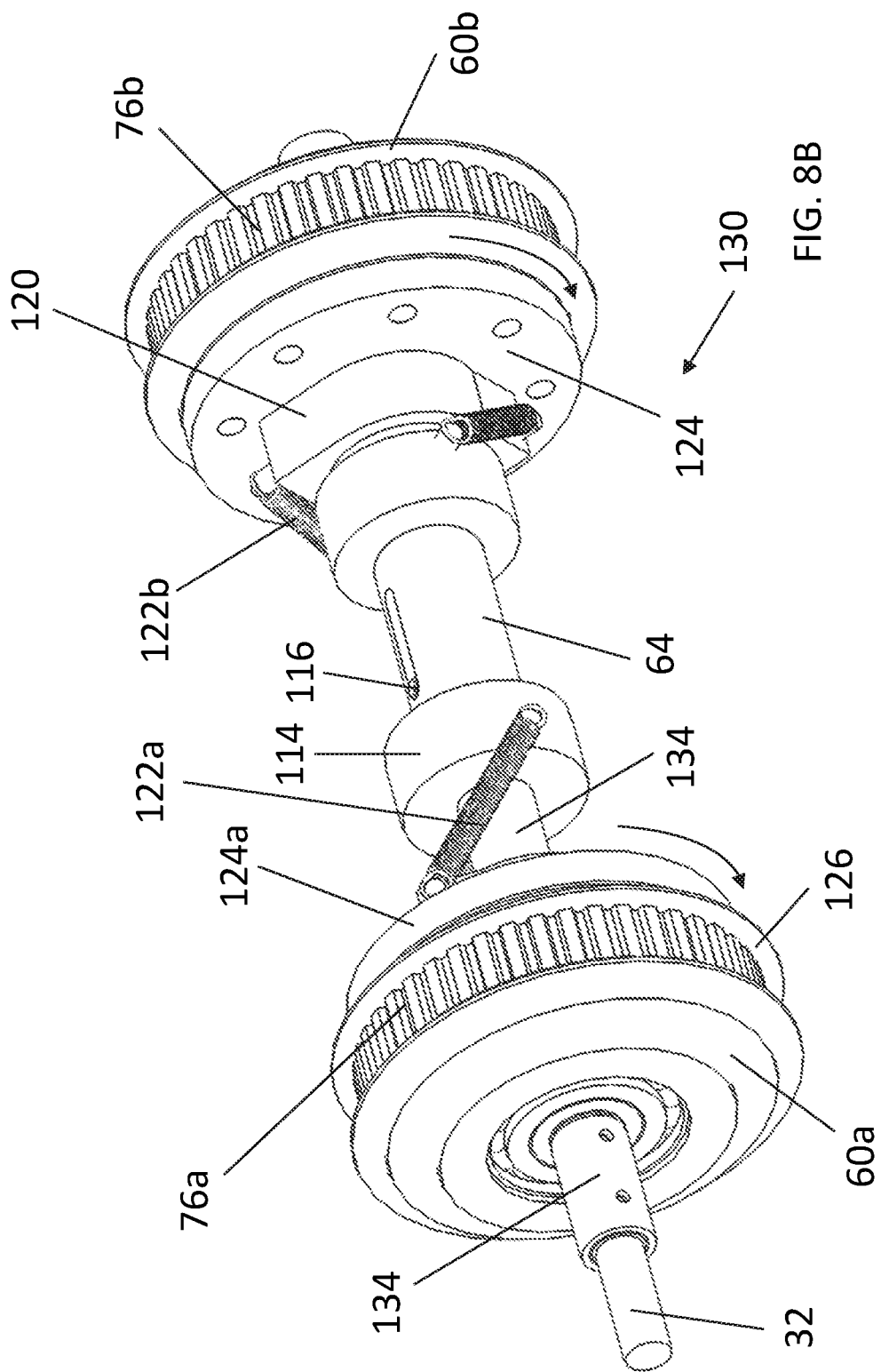

The linkage assembly of each torque conversion unit 60 comprises a directional block 120, linkage connectors 122, and a bias pin plate 124 that is connected to the outer bell housing 126 of the torque conversion unit 60. The linkage connector 122 in some embodiments may be a spring that has a first end attached to a nub 128 or other attachment fixture on the directional block 120 with the other end of the spring connected to the directional disk 114 on the shift sleeve 64. The directional block 120 is affixed to the bias pin plate 124 and mounted on a collar 140 that has bearings. A locking pin 142 on the drive shaft 32 provides for the collar 140 to rotate with the drive shaft 32 with the directional block 120 and bias pin plate 124 free to rotate separately from the drive shaft 32 on the bearings of the collar 140. The springs of the linkage connector 122 attach the directional block 120 and bias pin plate 124 to the shift sleeve 64. As the springs 122 are stretched, the directional block 120 and bias pin plate 124 of the torque conversion unit 60 are pulled in the direction of rotation selected for the drive shaft 32. As shown in FIG. 8A, the direction of rotation is set by selecting the directional switch 30 to move the shift sleeve 64 towards one of the torque conversion units (60b in this example) and thereby stretch the linkage connector 122a to pull the free spinning directional block 120a and bias pin plate 124a into the selected direction of rotation for example clockwise rotation while the compressed springs 122b of the linkage connector on the opposite end also force the free spinning directional block 120b and bias pin plate 124b into the selected clockwise direction as shown by the arrows in FIG. 8B and thereby imparting a rotational force to the bias pin plates 124a and 124b around the axis of the drive shaft 32. When the shift sleeve 64 is biased so as to lengthen springs 122a and compress springs 122b, the bias pin plates 124a and 124b are forced into a rotational bias counter to each other relative to the driveshaft 32. When the bias position of shift sleeve 64 is reversed, the rotational bias of bias pin plates 124a and 124 are likewise reversed.

Figure 9:
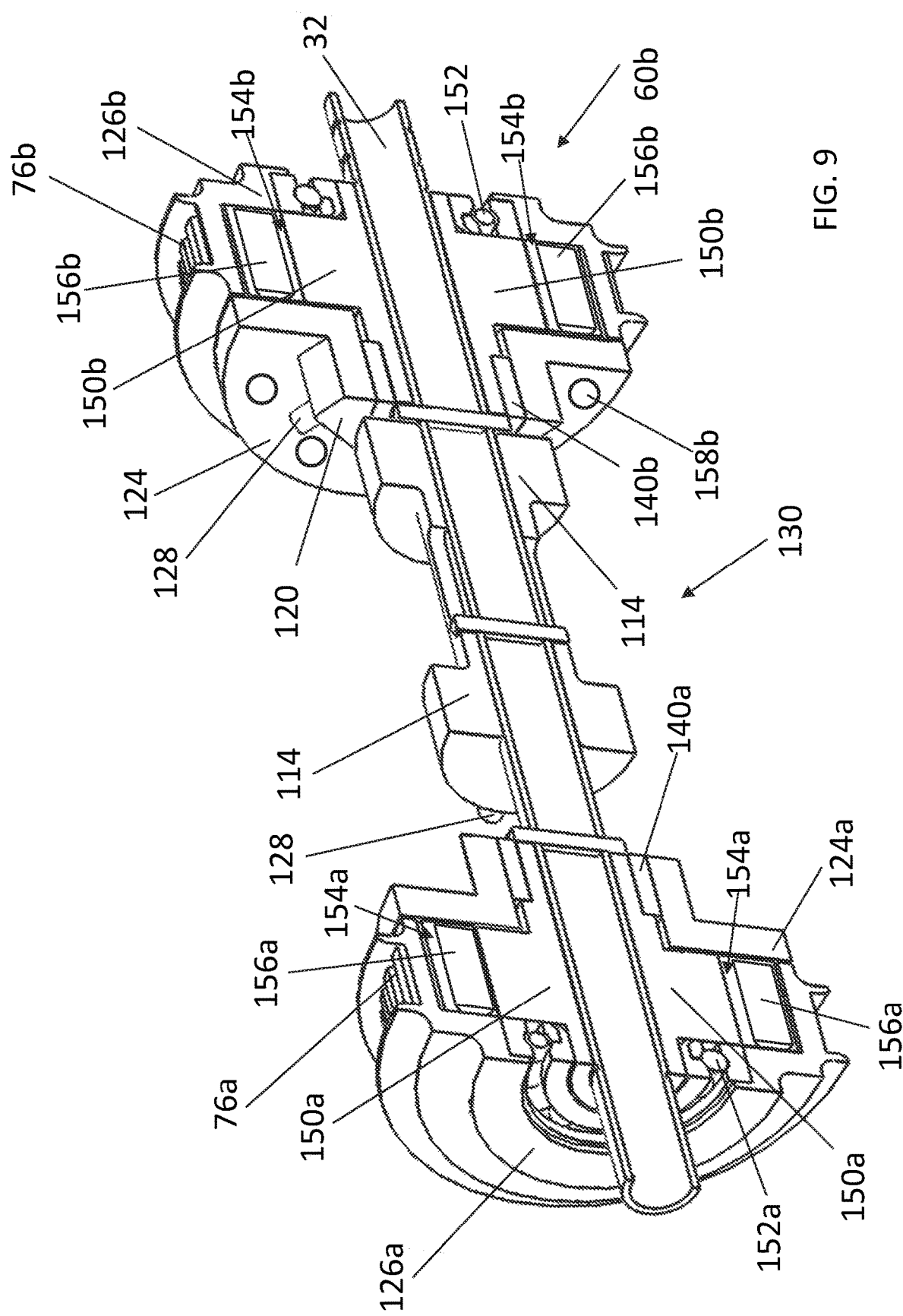
FIG. 9 is a cross-sectional view of an embodiment of the torque conversion assembly in an embodiment of the oscillating reversible motor of the present invention.

In using the shift sleeve 64 to invoke the rotational bias of the bias pin plates 124a and 12b on each forward stroke of lever 12a, the strap 72a engages with the drive gear 76a and applies torque to the torque conversion unit 60a and on each forward stroke of lever 12b, the strap 72b engages with the drive gear 76b and applies torque to the torque conversion unit 60b. After the forward stroke of lever 12a, the directional block 120a and bias pin plate 124a freely spin on the backstroke of lever 12a as lever 12b applies torque to torque conversion unit 60b and lever 12a is repositioned for the next forward stroke. Similarly, the directional block 120b and bias pin plate 124b freely spin on the backstroke of lever 12b as lever 12a applies torque to torque conversion unit 60a and lever 12b is repositioned for the next forward stroke As shown in FIG. 9 in a cross-sectional view of the torque conversion assembly 130, the outer bell housing 126a and 126b supports the drive gear 76a and 76b and mates with the bias pin plate 124a and 124b to encase an inner cam lobe 150a and 150b. The inner cam lobe 150a and 150b is affixed to the drive shaft 32. The outer bell housing 126a and 126b of each torque conversion unit 60a and 60b is supported on bearings 152a and 152b installed on the inner cam lobe 150a and 150b providing for the drive shaft 32 to rotate as torque is applied to the drive gear 76a and 76b and allow for the bell housing 126a and 126b to freewheel when torque from the lever 12a or 12b is applied in a direction opposite to the selected rotational direction of the drive shaft 32. The bias pin plate 124a and 124b is supported by bearings 140a and 140b and freely rotates separately from the outer bell housing 126 and inner cam lobe 150. Within a void 154 between the inner cam lobe 150 and the outer bell housing 126 there are a plurality of cam rollers 156 freely movable within interference zones within the void 154. The specific number of cam rollers 156 corresponds to the design of the inner cam lobe 150 and the number of pins 158 of the bias pin plate 124 as described herein.

Figure 10:
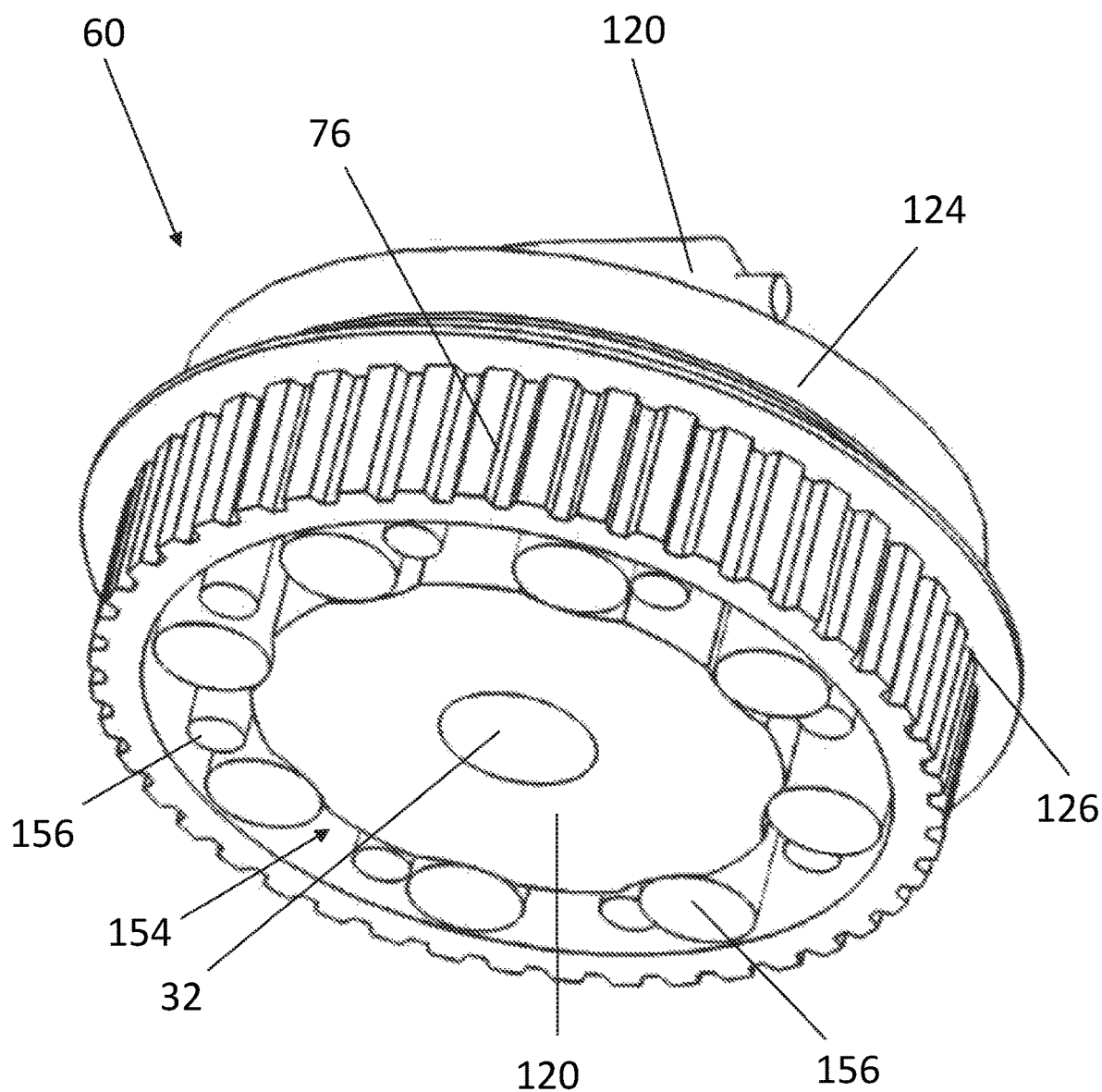
FIG. 10 is a perspective view of an embodiment of the torque conversion unit in an embodiment of the oscillating reversible motor of the present invention.
Figure 11B:
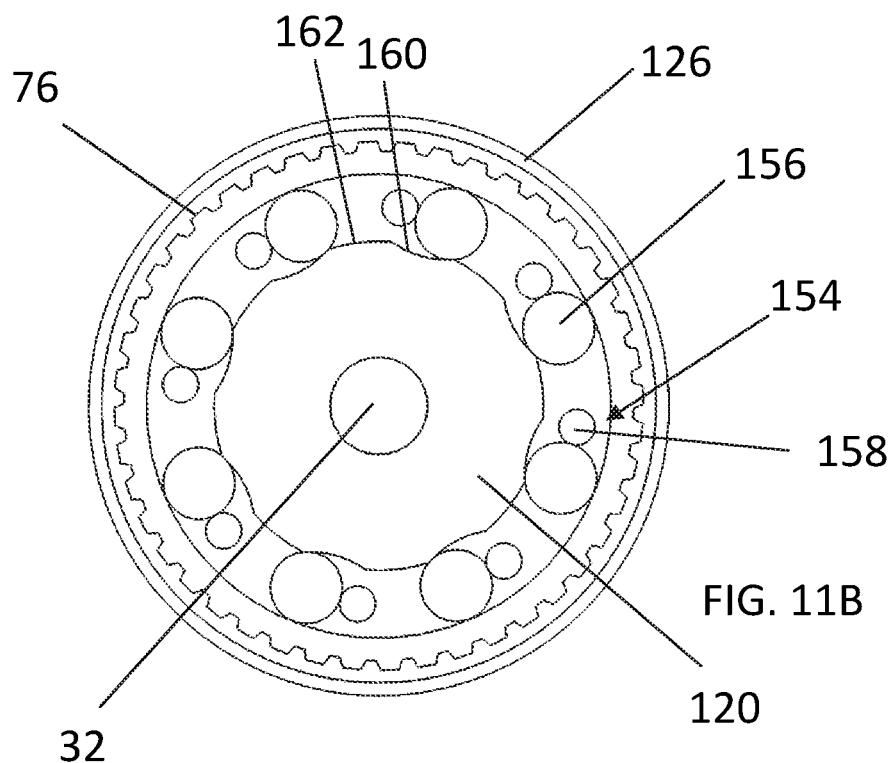
FIG. 11B is an elevation view of an embodiment of the torque conversion unit configured to provide counterclockwise rotation in an embodiment of the oscillating reversible motor of the present invention.
Figure 11A:
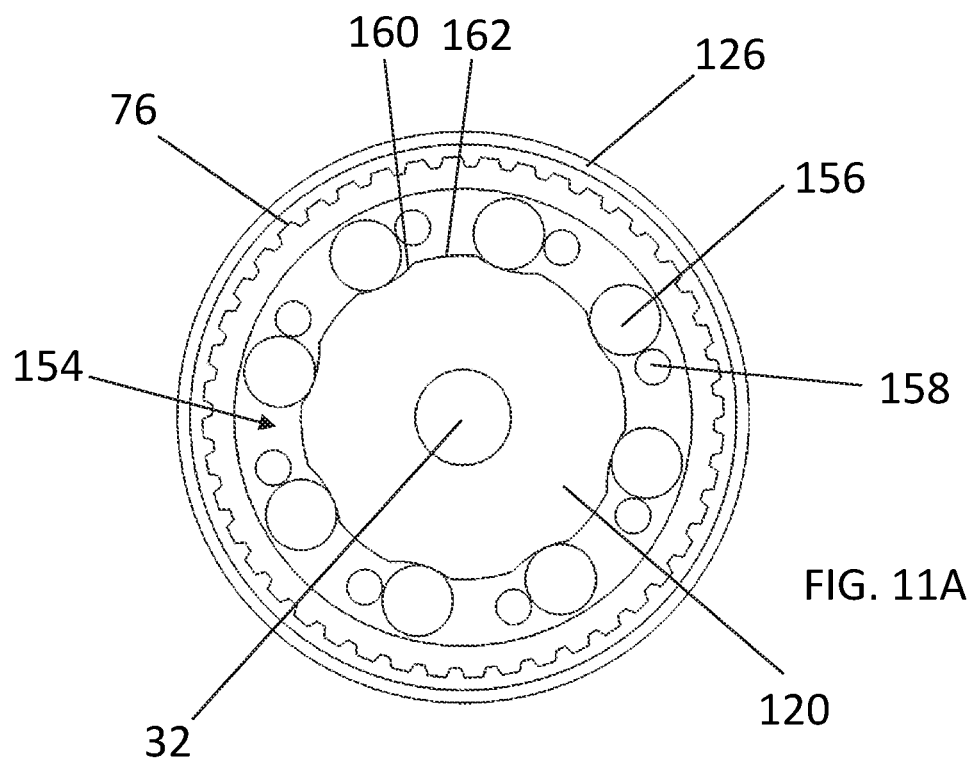
FIG. 11A is an elevation view of an embodiment of the torque conversion unit configured to provide clockwise rotation in an embodiment of the oscillating reversible motor of the present invention.
Figure 12A:
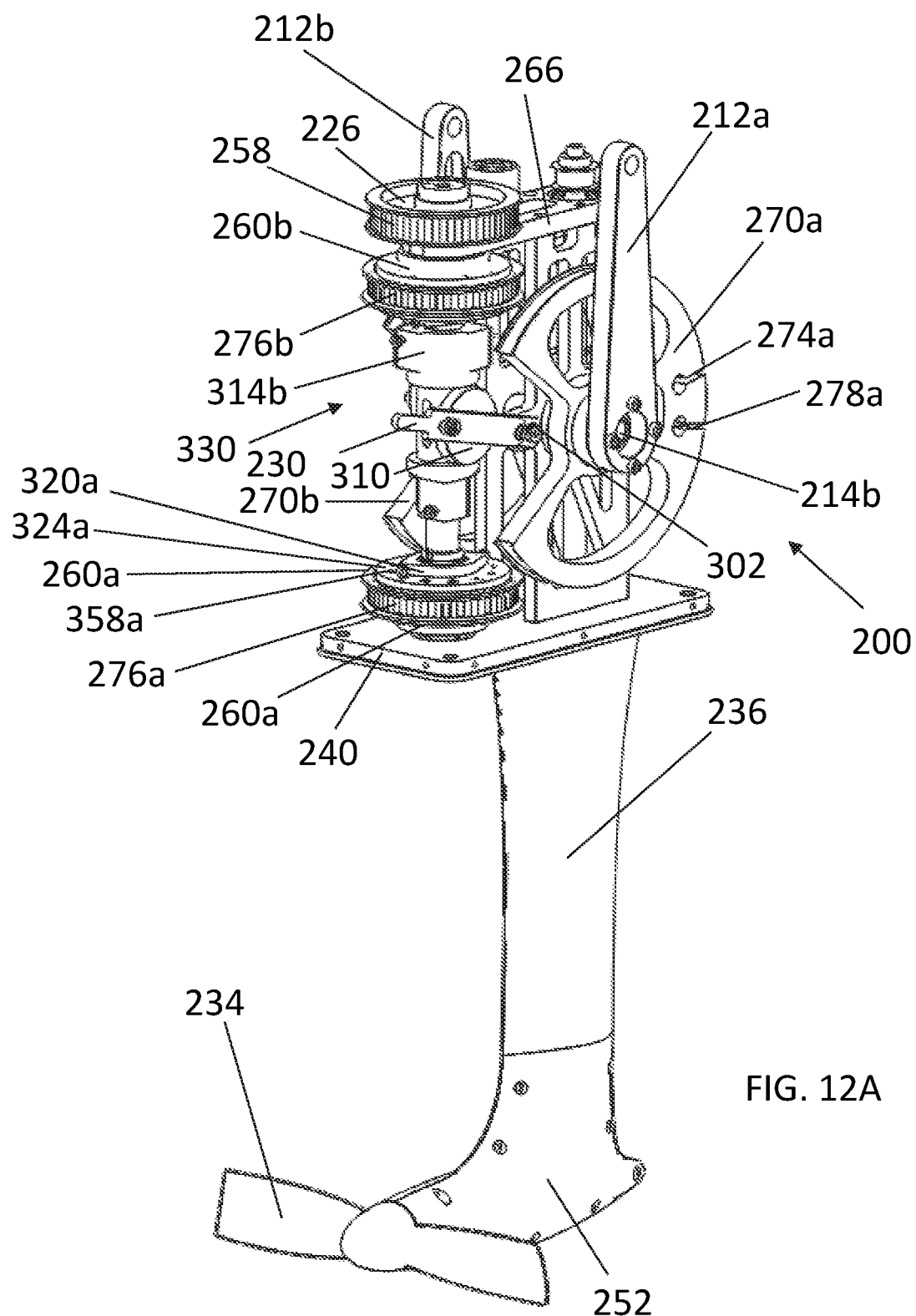
FIGS. 12A and 12B are perspective views of another embodiment of the oscillating reversible motor of the present invention with the torque conversion assembly in a vertical orientation.
Figure 12B:
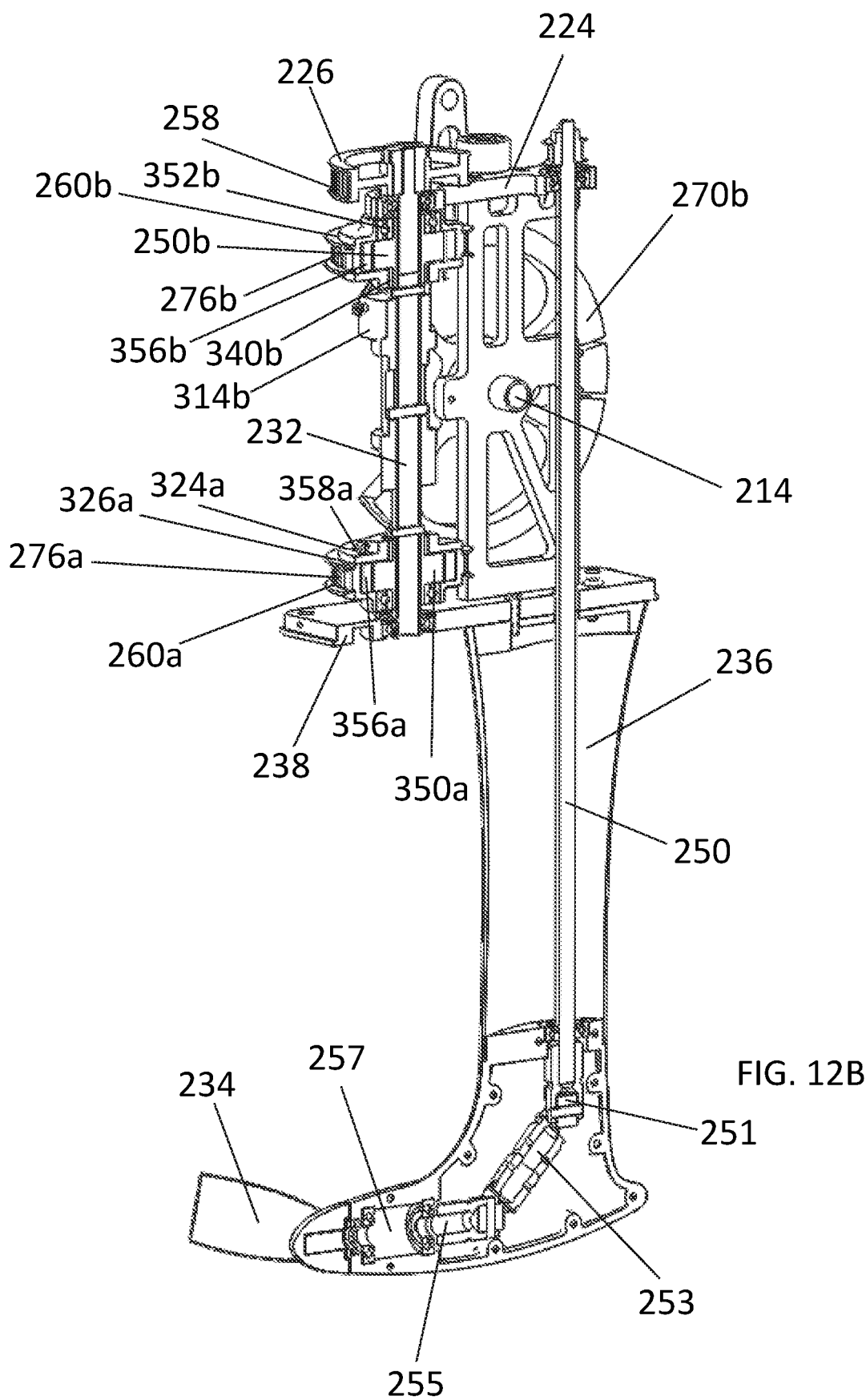

As shown in FIG. 10 in a perspective view with a portion of the outer bell housing 126 removed, the torque conversion unit 60 provides additional directional biasing using the cam rollers 156 and the pins 158 of the bias pin plate 124. As shown the pins 158 are affixed to the bias pin plate 124 and are circumferential distributed around the axis of rotation of the drive shaft 32. The pins 158 extend from the bias pin plate 124 into the void 154 and thereby are interspersed between the cam rollers 156 that float freely within the void 154. As shown in FIG. 11A, in an elevation view the inner cam lobe 150 has an irregular surface with semicircular indents 160 that are slightly larger in radius than each cam roller 156 with a raised portion 162 that creates a distance between the outer surface of the inner cam lobe 150 and outer bell housing 126 that is less than the diameter of the cam roller 156 thereby containing the cam rollers 156 in segments or interference zones distributed around the axis of rotation of the drive shaft 32. The area within each interference zone is sufficient for the cam roller 156 to be movable and the pin 158 to be inserted within the interference zone. The cam roller 156 will therefore not pass by the interference zone of the void due to this geometrical interference. The material selection of the inner cam lobe 150, the outer bell housing 126 and the cam rollers 156 is such that when each cam roller 156 enters each interference zone they do not deform or slip relative to the inner cam lobe 150 and the outer bell housing 126. Further, the outer bell housing 126 and the inner cam lobe 150 may not deform when the cam rollers 156 enter the interference zones. Each pin 158 of the bias pin plate 124 rotates freely along its shared axis with the inner cam lobe 150 and the outer bell housing 126 within the confines of the empty space within each interference zone between the cam rollers 156. The bias pins 158 force the cam rollers 156 up the ramp of the indent 160 to bind the inner cam lobe 150 to the bell housing 126 to rotate the drive shaft 32 in the selected direction as the bias pin plate 124 is acted on by the linkage connectors 122. The bell housing 126 rotates freely as the lever 12 returns to the opposite direction.

Changing the torque output direction of the torque conversion units 60a and 60b is accomplished by selecting the direction switch 30 to move the shift sleeve 64 towards one of the torque conversion units 60 thereby rotating the bias pin plate 124 in a clockwise or counterclockwise direction until the pins 158 come in contact with the array of cam rollers 156 within the void 154. This motion allows the bell housing 126 to transfer torque into the inner cam lobe 150 in one direction only. The cam rollers 156 are biased toward either their left or right, depending on the direction selected with both directions having distinct interference zones. When the bell housing 126 is rotated in the opposite direction from the selected current biasing direction, the cam rollers 156 pull away from the interference zone due to surface friction and allow the bell housing 156 to move freely relative to the inner cam lobe 150. For one cycle of the input levers 12a and 12b in a configuration utilizing two torque input levers 12a and 12b and corresponding two torque conversion units 60a and 60b, one lever 12a is causing its corresponding strap 72a to traverse the gear assembly 76a on its torque conversion unit 60a in a direction which transfers torque into the drive shaft 32, while the other lever 12b is causing its strap 72b to move opposite to the selected current rotation direction of the drive shaft 32, causing the bell housing 126b on its corresponding torque conversion unit 60b to unload and freewheel. Each forward lever motion from user force input transmits torque into the drive shaft 32, and each reverse lever motion does not transfer torque into the drive shaft. Selecting the direction switch 30 to move the shift sleeve 64 and bias the bias pin plate 124 in one direction and thereby bias the cam rollers 156 from a clockwise to a counterclockwise torque output alters which torque conversion unit 60a or 60b is biased clockwise and which is biased counterclockwise.

In a further embodiment of the oscillating reversible motor 10, the torque conversion assembly 330 is oriented in parallel to the drive assembly system. In this embodiment, operation of the oscillating reversible motor 200 is similar with an input section utilizing one or more oscillating movements through rotating input levers 212 or through other means. The input levers 212 are connected to an input shaft 214 which is supported on a frame 266. A drive strap (not shown) is attached to a pinch clamp 274a of a first input wheel 270a and engages the drive gear 276a of the torque conversion unit 260a and is attached to the other input wheel 270b at a pin clip (not shown). The second drive strap (not shown) is attached to the input wheel 270b at a pinch clamp (not shown) and engages the drive gear 276b of the torque conversion unit 260b and is attached to pin clip 278a of input wheel 270a. The attachment of the drive straps (not shown) to each input wheel 270 and 270b provides for lever 212a to move in the opposite direction to lever 212b. As lever 212a is pushed forward, the strap applies torque to torque conversion unit 260a with the torque conversion unit 260b disengaging and freewheeling as lever 212b returns on its back stroke. As lever 212b is pushed forward, the strap applies torque to torque conversion unit 260b with the torque conversion unit 260a disengaging and freewheeling as lever 212a returns on a back stroke with the application of torque during each forward stroke of the levers 212a and 212b forcing a drive shaft 232 to rotate in one direction. Therefore, unlike oscillating machines of the prior art, the drive shaft 232 remains in a constant single rotational direction through the oscillations of the levers 212a and 212b.

Similarly, to the previous embodiment, the direction selection switch 230 sets the rotational direction of the drive shaft 232 to rotate in either a clockwise or counter clockwise direction and the drive shaft 232 continues rotation in this selected direction until the direction selection switch is reset to the opposite direction. A pivot pin 302 affixes the selection switch 230 to the frame 266 and a shift disk 310 moves the shift sleeve 264 along the drive shaft 232. The direction of rotation is set by selecting the directional switch 230 to move the shift sleeve 264 towards one of the torque conversion units (260b in this example) and thereby stretch the linkage connector (not shown) to pull the free spinning directional block 320a and bias pin plate 324a into the selected direction of rotation for example clockwise rotation while the linkage connector (not shown) on the opposite end of the shift sleeve 64 forces the free spinning directional block 320b and bias pin plate 324b of the torque conversion unit 260b into the selected clockwise direction and thereby imparting a rotational force to the bias pin plates 324a and 324b of the torque conversion units 260a and 260b around the axis of the drive shaft 232.

The torque conversion units 260a and 260b also provide additional directional biasing using cam rollers 356a and 356b and the pins 358a and 358b of the bias pin plates 324a and 324b that are as shown within interference zones of voids 354a and 354b between the inner cam lobe 350a and 350b and the outer bell housing 356a and 356b of each torque conversion unit 260a and 260b. As an example, as torque is applied to the drive shaft 232 by the gear assembly 276a being rotated with the bell housing 326a by the forward stroke of lever 212a, the bias pin plate 324a is acted on by the linkage connectors (not shown) to force the bias pin plate 324a to rotate the bias pins 358a to force the cam rollers 356a in the selected direction of rotation. During the forward stroke of lever 212a, lever 212b moves through its backstroke and the bell housing 326b and bias pin plate 324b are freewheeling and thereby applying no rotational torque to the drive shaft 232. As the lever 212a completes its forward stroke, lever 212b begins its forward stroke engaging the gear assembly 276b and rotating the bell housing 326b. The linkage connectors (not shown) act on the bias pin plate 324b to force the bias pin plate 324b to rotate the bias pins 358b to force the cam rollers 356b in the selected direction of rotation. During the forward stroke of lever 212b, lever 212a moves through its backstroke and the bell housing 326a and bias pin plate 324a are freewheeling and thereby applying no rotational torque to the drive shaft 232 as lever 12a returns on its backstroke.

Therefore, each forward lever motion of 212a and 212b transmits torque into the drive shaft 232 and the rotational direction is set by the rotational selection switch 230 to move the shift sleeve 264 and bias the bias pin plates 324a and 324b of the torque conversion units 260a and 260b in one direction and thereby maintain the rotational direction of the drive shaft 232 in one direction as the levers 212a and 212b oscillate. The drive shaft 232 in this embodiment is affixed to a drive pulley 226 that is couple using a drive belt 224 or other gearing mechanism to an output shaft 250 aligned in parallel to the drive shaft 232. In order to convert the vertical rotation of the drive shaft 232 to a horizontal rotation for an output device such as in this example a water propeller 234 for propulsion, a double universal joint having a first universal joint 251 articulated at an angle at the base of the output shaft 250 and connected to an angled extension 253 that connects to a second universal joint 255 which connects to an output rod 257 for the attachments of the propeller 234 or other output device.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the air guns to particular applications, without departing from the scope of the following claims and equivalents of the claimed elements.

What is claimed is:

1. A motor for the conversion of an oscillating input to a rotary output which is reversible by user selection, comprising:
   one or more oscillating torque inputs;
   one or more torque conversion units, comprising:
      an inner cam lobe configured to transfer torque to a rotary shaft;
      a bell housing configured to apply torque and freewheel on alternating phases of the oscillating torque inputs;
      a directional selection switch configured to select the rotational direction of torque output; and
      a drive shaft configured to transfer the selected unidirectional rotational torque to an output device.

2. The motor of claim 1 wherein the oscillating torque inputs comprising levers operable by a foot or hand.

3. The motor of claim 1 wherein the output device is a propeller to perform propulsion through fluidic mediums.

4. The motor of claim 1 wherein the torque conversion units comprising:
   a bias pin plate having a plurality of pins;
   a plurality of cam rollers movable within a void formed between the inner cam lobe and the bell housing; and
   wherein the plurality of pins of the bias pin plate bias the cam rollers in the selected rotational direction.

5. The motor of claim 1 wherein the one or more torque conversion units comprising:
   a bias pin plate;
   a plurality of linkage connectors; and
   wherein the linkage connectors bias the bias pin plate in the selected rotational direction.

6. The motor of claim 1 wherein the drive shaft is parallel with the output shaft.

7. The motor of claim 1 wherein the drive shaft is perpendicular to the output shaft.

8. An oscillating reversible motor comprising:
   a first input lever connected to a second input lever and operable to apply torque to a first torque conversion unit on a forward stroke and return on a backstroke;
   the first torque conversion unit configured to apply torque to a rotatable shaft on the forward stroke of the first input lever and disengage from the rotatable shaft and freewheel during the backstroke of the first input lever;
   the second input lever operable to apply torque to a second torque conversion unit on a forward stroke of the second input lever and return on a backstroke;
   the second torque conversion unit configured to apply torque to a rotatable shaft on the forward stroke of the second input lever and disengage from the rotatable shaft and freewheel during the backstroke of the second input lever; and
   wherein the first and second input levers oscillate to rotate the rotatable shaft in a single direction.

9. The oscillating reversible motor of claim 8 comprising a direction selection switch configured to set the direction of rotation of the rotatable shaft as a clockwise or counterclockwise rotation.

10. The oscillating reversible motor of claim 9 wherein the direction selection switch comprising a shift sleeve movable along the rotatable shaft and a plurality of linkage connectors configured to bias the first and second torque conversion units in the direction of rotation selected using the direction selection switch.

11. The oscillating reversible motor of claim 8 wherein each of the first and second torque conversion units comprising:
    a plurality of cam rollers;
    an inner cam lobe;
    a bell housing and bias pin plate encasing the inner cam lobe along the rotatable shaft and providing a void for the cam rollers to freely move within interference zones formed between the inner cam lobe and bell housing; and
    wherein the bias pin plate having pins for biasing the cam rollers to apply torque to the rotatable shaft in the selected rotational direction.

12. A method of converting oscillating motion into rotary motion comprising:
    connecting a first input device to a second input device with each of the first and second input devices oscillating from a forward stroke to a backstroke;
    applying torque to a first torque conversion unit from the forward stroke of the first input device;
    freewheeling the first torque conversion unit on the backstroke of the first input device;
    applying torque to a second torque conversion unit from the forward stroke of the second input device;
    freewheeling the second torque conversion unit on the backstroke of the second input device;
    biasing the rotational direction of the applied torque from the first and second torque conversion units to a single rotational direction; and
    rotating a drive shaft in the single rotational direction from the applied torque of the first and second torque conversion units.

13. The method of converting oscillating motion into rotary motion of claim 12 comprising biasing a plurality of cam rollers in the single rotational direction.

14. The method of converting oscillating motion into rotary motion of claim 13 comprising forming a plurality of interference zones between a bell housing and the inner cam lobe for the plurality of cam rollers.

15. The method of converting oscillating motion into rotary motion of claim 12 comprising:
    linking a bias pin plate to a shaft sleeve;
    biasing a plurality of pins in the selected direction of rotation from the linking of the bias pin plate to the shaft sleeve;
    and biasing a plurality of cam rollers in the single rotational direction using the plurality of pins.

16. The method of converting oscillating motion into rotary motion of claim 12 comprising:
   selecting the single rotational direction as clockwise by linking a shaft sleeve to a bias pin plate of the first torque conversion unit;
   selecting the single rotational direction as counterclockwise by linking a shaft sleeve to a bias pin plate of the second torque conversion unit.

\* \* \* \* \*